United States Patent [19]

Schwarte et al.

[11] Patent Number: 5,601,880
[45] Date of Patent: Feb. 11, 1997

[54] PROCESS FOR THE PRODUCTION OF A MULTICOAT FINISH AND AQUEOUS BASECOAT SUITABLE FOR THIS PROCESS

[75] Inventors: Stephan Schwarte, Emsdetten; Arnold Dobbelstein, deceased, late of Müster, by Hildegard Dobbelstein, Christiane Dobbelstein, executors; Walter Lassmann, Müster; Susanne Piontek, Müster; Jürgen Niemann, Würzburg; Klaus Eikelmann; Ulrich Poth, both of Müster, all of Germany

[73] Assignee: BASF Lacke & Farben, AG, Muenster-Hiltrup, Germany

[21] Appl. No.: 286,587

[22] Filed: Aug. 5, 1994

Related U.S. Application Data

[63] Continuation of Ser. No. 927,522, Sep. 17, 1992, abandoned.

[30] Foreign Application Priority Data

Mar. 28, 1990 [DE] Germany ............... 40 09 858.3

[51] Int. Cl.⁶ ............... B05D 3/02; B05D 1/36
[52] U.S. Cl. ............... 427/407.1; 427/409; 427/411; 427/412.3; 427/412.4; 427/412.5; 427/418; 524/460; 524/522; 524/556; 524/560; 524/561
[58] Field of Search ............... 427/407.1, 409, 427/411, 412.3, 412.4, 412.5, 418; 524/460, 522, 556, 560, 561

[56] References Cited

U.S. PATENT DOCUMENTS 4,403,003  9/1983  Backhouse ............... 427/407.1

*Primary Examiner*—Ponnathapura Achutamurthy
*Attorney, Agent, or Firm*—Anne Gerry Sabourin

[57] ABSTRACT

The invention relates to basecoats for the production of paint systems of the basecoat-clearcoat type, which comprise a water-thinnable polyacrylate resin obtainable by polymerizing in a first stage in an organic solvent ethylenically unsaturated monomers free from carboxyl groups and, after at least 80% by weight of these monomers have reacted, polymerizing in a second stage monomers containing carboxyl groups and neutralizing the polyacrylate resin obtained in this way.

29 Claims, No Drawings

PROCESS FOR THE PRODUCTION OF A MULTICOAT FINISH AND AQUEOUS BASECOAT SUITABLE FOR THIS PROCESS

This is a continuation of application Ser. No. 07/927,522 filed on Sep. 17, 1992, now abandoned.

The invention relates to a process for the production of a multicoat, protective and/or decorative finish, in which process (1) an aqueous pigmented basecoat is applied to the substrate surface as basecoat,
(2) a polymer film is formed from the coating applied in stage (1),
(3) a transparent topcoat is applied to the basecoat obtained in this way, and subsequently
(4) the basecoat is baked together with the topcoat.

This process represents the well known basecoat/clearcoat process which is employed especially in the automotive industry for the production of high-quality finishes, in particular metallic effect finishes (cf. for example EP-A-38,127, EP-A-89,497 and DE-A-3,628,124).

The invention also relates to aqueous paints which can be used as basecoats in the above process.

The basecoat/clearcoat process under discussion employs predominantly basecoats which contain exclusively organic solvents as thinners and/or solvents.

The coatings industry has striven for ecological and economic reasons to replace as large a part of the organic solvents as possible by water. There is a great demand for aqueous basecoats which can be used in the basecoat/clearcoat process described above. An essential feature of the basecoat/clearcoat process is that the transparent topcoat is applied to the unbaked basecoat, and only then are the basecoat and topcoat baked together (wet-on-wet process).

The object of the present invention consists in providing novel aqueous paints which can be used as basecoats in the basecoat/clearcoat process. Surprisingly, this object is achieved by the provision of aqueous, pigmented paints containing a water-thinnable polyacrylate resin which can be obtained (I) by adding
  (a1) 40 to 90, preferably 40 to 80, % by weight of a (meth)acrylic acid ester essentially free from carboxyl groups, or a mixture of such (meth)acrylic acid esters,
  (a2) 0 to 45, preferably 4 to 34, % by weight of an ethylenically unsaturated monomer which contains at least one hydroxyl group per molecule and is essentially free from carboxyl groups, or a mixture of such monomers, and
  (a3) 0 to 40, preferably 10 to 30, % by weight of an ethylenically unsaturated monomer essentially free from carboxyl groups, which is different from (a1) and (a2), or a mixture of such monomers,
to an organic solvent or mixture of solvents and carrying out a polymerization in the presence of at least one polymerization initiator, and (II) by adding, after at least 80% by weight of the monomers added in stage (I) have reacted,
  (b1) 2.5 to 15, preferably 3 to 7, % by weight of an ethylenically unsaturated monomer containing at least one carboxyl group per molecule, or a mixture of such monomers, and
  (b2) 0 to 60, preferably 0 to 28, % by weight of an ethylenically unsaturated monomer essentially free from carboxyl groups, or a mixture of such monomers,
and continuing the polymerization and (III) by neutralizing, at least partially, the polyacrylate resin obtained at the end of the polymerization and dispersing it in water, the sum of the proportions by weight of (a1), (a2), (a3), (b1) and (b2) always 100% by weight and the type and amount of (a1), (a2), (a3), (b1) and (b2) being chosen so that the polyacrylate resin obtained from (a1), (a2), (a3), (b1) and (b2) has a hydroxyl value of 0 to 200, preferably 20 to 120, an acid value of 20 to 100, preferably 25 to 50, and a glass transition temperature ($T_G$) of $-40°$ to $+60°$ C., preferably $-20°$ to $+40°$ C.

The water-thinnable polyacrylate resins used according to the invention allow the formulation of basecoats which possess—especially in comparison with known basecoats containing polyacrylate resins—a higher solids content and a lower tendency to form runs. In addition, the use of the water-thinnable polyacrylate resins according to the invention, especially in polyurethane-containing basecoats, provides stabilization against fluctuating shearing stresses. Compared with the state of the art, a lower reduction in viscosity, or no reduction at all, occurs especially on exposure to weak shearing forces. This results in improved sedimentation behaviour, simpler handling and increased application reliability.

A more detailed description of the preparation of the water-thinnable polyacrylate resins essential to the invention is preceded by an explanation of two terms used:

1) The term "(meth)acrylic acid" is occasionally used as an abbreviation for "methacrylic acid or acrylic acid".
2) The expression "essentially free from carboxyl groups" is intended to indicate that the components (a1), (a2), (a3) and (b2) may have a low carboxyl group content (but no higher than would cause polyacrylate resin prepared from the components (a1), (a2), (a3) and (b2) to have an acid value no higher than 10). It is preferred, however, for the carboxyl group content of the components (a1), (a2), (a3) and (b2) to be as low as possible. Components (a1), (a2), (a3) and (b2) which are entirely free from carboxyl groups are particularly preferred.

For the preparation of the polyacrylate resins to be used according to the invention any ester of (meth)acrylic acid which is essentially free from carboxyl groups and is copolymerizable with (a2), (a3), (b1) and (b2), or a mixture of such (meth)acrylic acid esters, may be used as the component (a1). Suitable examples are alkyl acrylates and alkyl methacrylates having up to 20 carbon atoms in the alkyl radical, such as methyl, ethyl, propyl, butyl, hexyl, ethylhexyl, stearyl and lauryl acrylate and methacrylate, and cycloaliphatic (meth)acrylic acid esters, such as cyclohexyl (meth)acrylate. Mixtures of alkyl acrylates and/or alkyl methacrylates which consist of at least 25% by weight of n-butyl and/or t-butyl acrylate and/or n-butyl and/or t-butyl methyacrylate [sic], are preferably used as the (a1) component.

Any ethylenically unsaturated monomer which contains at least one hydroxyl group per molecule, is essentially free from carboxyl groups and is copolymerizable with (a1), (a3), (b1) and (b2), or a mixture of such monomers, may be used as the component (a2). Suitable examples are hydroxyalkyl acrylates, hydroxyalkyl methacrylates or hydroxyalkyl esters of another α,β-ethylenically unsaturated carboxylic acid. These esters may be derived from an alkylene glycol esterified with the acid, or they may be obtained by reaction of the acid with an alkylene oxide. Hydroxyalkyl acrylates and hydroxyalkyl methacrylates in which the hydroxyalkyl group contains up to 4 carbon atoms, reaction products from cyclic esters, for example ε-caprolactone, and these hydroxyalkyl esters, or mixtures of these hydroxyalkyl esters or ε-caprolactone-modified hydroxyalkyl esters, are preferably used as the component (a2). Suitable examples of such hydroxyalkyl esters are 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate and 4-hydroxybutyl methacrylate. Corresponding esters of other unsaturated acids, for example ethacrylic acid, crotonic acid and similar acids having up to about 6 carbon atoms per molecule, may also be used.

Any ethylenically unsaturated monomer which is essentially free from carboxyl groups, is different from (a1) and (a2) and is copolymerizable with (a1), (a2), (b1) and (b2), or a mixture of such monomers, may be used as the component (a3). Vinylaromatic hydrocarbons, such as styrene, α-alkylstyrene and vinyltoluene, are preferably used as the component (a3).

The polyacrylate resins used according to the invention are prepared by polymerizing in stage (I) the component (a1) together with (a2), if appropriate, and together with (a3), if appropriate, in an organic solvent or mixture of solvents in the presence of at least one polymerization initiator.

Those solvents and polymerization initiators which are conventional for the preparation of polyacrylate resins and suitable for the preparation of aqueous dispersions may be used as the organic solvents and polymerization initiators. Examples of usable solvents are butyl glycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diiethyl [sic] ether, diethylene glycol monobutyl ether and 3-methyl-3-methoxybutanol. Examples of usable polymerization initiators are initiators forming free radicals, such as benzoyl peroxide, azobisisobutyronitrile, t-butyl perethylhexanoate and t-butyl perbenzoate. The polymerization is expediently performed at a temperature of 80° to 160° C., preferably 110° to 160° C.

After at least 80% by weight, preferably at least 90% by weight, of the monomers added in stage (I) have reacted, in stage (II)

(b1) 2.5 to 15, preferably 3 to 7, % by weight of an ethylenically unsaturated monomer containing at least one carboxyl group per molecule, or a mixture of such monomers, and (b2) 0 to 60, preferably 0 to 28, % by weight of an ethylenically unsaturated monomer essentially free from carboxyl groups, or a mixture of such monomers are added and polymerized in the presence of the reaction product obtained in stage (I). The polymerization in stage (II) is carried out until the monomers added in stages (I) and (II) have essentially completely reacted.

Any ethylenically unsaturated monomer which contains at least one carboxyl group per molecule and is copolymerizable with (a1), (a2), (a3) and (b2), or a mixture of such monomers, may be used as the component (b1). Acrylic acid and/or methacrylic acid are preferably used as the component (b1). However, other ethylenically unsaturated acids having up to 6 carbon atoms in the molecule may also be used. Suitable examples of such acids are etharyl [sic] acid, crotonic acid, maleic acid, fumaric acid and itaconic acid. Mono(meth)acryloyloxyethyl maleate, mono(meth)acryloyloxyethyl succinate and mono(meth)acryloyloxyethyl phthalate may also be used as the component (b1).

Any ethylenically unsaturated monomer which is copolymerizable with (a1), (a2), (a3) and (b1), or a mixture of such monomers, may be used as the component (b2). Any of the monomers listed in the description of the components (a1), (a2) and (a3) may be used as the component (b2).

The type and amount of the components (a1), (a2), (a3), (b1) and (b2) are chosen so that the polyacrylate resin has a hydroxyl value of 0 to 200, preferably 20 to 120, an acid value of 20 to 100, preferably 25 to 50, and a glass transition temperature ($T_G$) of −40° C. to +60° C., preferably −20° C. to +40° C.

The glass transition temperatures of polyacrylate resins may be calculated using the following formula:

$$\frac{1}{T_G} = \sum_{n=1}^{n=x} \frac{W_n}{T_{Gn}}$$

$T_G$=glass transition temperature of the polyacrylate resin x=number of the various monomers copolymerized in the polyacrylate resin $W_n$=proportion by weight of the nth monomer $T_{Gn}$=glass transition temperature of the homopolymer obtained from the nth monomer The amount and rate of addition of the initiator are preferably chosen so that the resultant polyacrylate resin has a number average molecular weight of 2500 to 20000. It is preferred to commence the addition of the initiator at the same time as the addition of the monomers and to conclude it about a half-hour after the addition of the monomers has been concluded. The initiator is preferably added at a constant amount per unit of time. When the addition of the initiator is concluded, the reaction mixture is kept at the polymerization temperature until all the monomers used have essentially completely reacted (usually about 1½ hours). The term "essentially completely reacted" is intended to indicate that preferably 100% by weight of the monomers used have reacted, but that it is also possible for a small residual monomer content of not more than about 0.5% by weight, based on the weight of the reaction mixture, to remain unreacted.

When the polymerization is concluded, the resultant polyacrylic resin is at least partially neutralized and dispersed in water.

Both organic bases and inorganic bases may be employed for the neutralization. Primary, secondary and tertiary amines, such as ethylamine, propylamine, dimethylamine, dibutylamine, cyclohexylamine, benzylamine, morpholine, piperidine and triethanolamine are preferably used. Tertiary amines are particularly preferably used as the neutralization agent, in particular dimethylethanolamine, triethylamine, tripropylamine and tributylamine.

The neutralization reaction is generally performed by mixing the neutralizing base with the polyacrylate resin. The amount of base used for this purpose is preferably such that the basecoat has a pH of 7–8.5, preferably 7.2 to 7.8.

The partially or completely neutralized polyacrylate resin is then dispersed by adding water. An aqueous polyacrylate resin dispersion resulting therefrom. If convenient, some or all of the organic solvent can be distilled off. The polyacrylate resin dispersions according to the invention contain polyacrylate resin particles having an average particle size preferably between 60 and 300 nm (method of measurement: laser light scattering; measuring instrument: Malvern Autosizer 2C).

Using the polyacrylate resins described above as binders, aqueous basecoats according to the invention can be produced. However, it is preferred to combine the polyacrylate resins with at least one water-thinnable polyurethane resin and/or at least one water-thinnable polyester resin and/or at least one water-thinnable amino resin as binders. For basecoats which comprise non-metallic pigments or mixtures of non-metallic pigments only and no metallic pigments, a mixture is preferably used consisting of (A) 10 to 95, preferably 25 to 70, % by weight of the water-thinnable polyacrylate resin according to the invention,
(B) 5 to 50, preferably 10 to 40, % by weight of an amino resin,
(C) 0 to 85, preferably 20 to 60, % by weight of a water-thinnable polyester resin and
(D) 0 to 85, preferably 0 to 40, % by weight of a water-thinnable polyurethane resin.

The sum of the proportions by weight the components (A) to (D) is always 100% by weight.

For basecoats which comprise a metallic pigment or a mixture of metallic pigments, in combination with non-metallic pigments if appropriate, a mixture is used as binder preferably consisting of (A) 0.1 to 60, preferably 1 to 30, % by weight of the water-thinnable polyacrylate resin according to the invention,
(B) 0 to 50, preferably 5 to 30, % by weight of an amino resin,
(C) 0 to 50, preferably 15 to 40, % by weight of a water-thinnable polyester resin and
(D) 10 to 99.9, preferably 20 to 60, % by weight of a water-thinnable polyurethane resin.

The percentages by weight of the components (A) to (D) always add up to 100% by weight.

The polyacrylate resins under discussion may be combined, for example, with water-thinnable polyurethane resins which can be prepared by reacting (i) a polyester polyol and/or a polyether polyol having a number average molecular weight of 400 to 5000 or a mixture of such polyester polyols and/or polyether polyols,
(ii) a polyisocyanate or a mixture of polyisocyanates,
(iii) a compound which contains in the molecule at least one group reactive toward isocyanate groups and at least one group capable of forming anions, or a mixture of such compounds,
(iv) if appropriate, an organic compound having a molecular weight of 40 to 600 which may contain hydroxyl and/or amino groups, or a mixture of such compounds and,
(v) if appropriate, a compound which contains in the molecule at least one group reactive toward NCO groups and at least one poly(oxyalkylene) group, or a mixture of such compounds, with each other and neutralizing, at least partially, the resultant reaction product. The polyurethane resin should expediently have an acid value of 10 to 60 and a number average molecular weight of 4000 to 25000.

The polyurethane resins may be prepared from (i), (ii), (iii), (iv) if appropriate and (v) if appropriate by methods of polyurethane chemistry well known to a person skilled in the art (cf., for example, U.S. Pat. No. 4,719,132, DE-A-3,628, 124, EP-A-89,497, EP-A-256,540 and WO 87/03829).

Saturated and unsaturated polyester polyols and/or polyether polyols, in particular polyester diols and/or polyether diols having a number average molecular weight of 400 to 5000 may be used as the component (i). Suitable polyether diols are, for example, polyether diols of the general formula $H(-O-)CHR^1)_n-)_mOH$, in which $R^1$ is hydrogen or a lower, substituted or unsubstituted alkyl radical, n is 2 to 6, preferably 3 to 4 and m is 2 to 100, preferably 5 to 50. Suitable examples are linear or branched polyether diols such as poly(oxyethylene) glycols, poly(oxypropylene) glycols and poly(oxybutylene) glycols. The chosen polyether diols should not introduce excessive amounts of ether groups, since otherwise the polymers formed swell in water. The preferred polyether diols are poly(oxypropylene) glycols in the molecular mass range $M_n$ of 400 to 3000.

Polyester diols are prepared by esterification of organic dicarboxylic acids or their anhydrides with organic diols or they are derived from a hydroxycarboxylic acid or a lactone. To prepare branched polyester polyols, polyols or polycarboxylic acids of a higher valency may be used to a small extent. The dicarboxylic acids and diols may be linear or branched aliphatic, cycloaliphatic or aromatic dicarboxylic acids or diols.

The diols used for the preparation of the polyesters consist, for example, of alkylene glycols, such as ethylene glycol, propylene glycol, butylene glycol, 1,4-butanediol, 1,6-hexanediol, neopentylglycol and other diols such as dimethylolcyclohexane. However, small amounts of polyols, such as trimethylolpropane, glycerol and pentaerythritol, may be added. The acid component of the polyester consists primarily of low-molecular dicarboxylic acids or their anhydrides having 2 to 30, preferably 4 to 18, carbon atoms in the molecule. Examples of suitable acids are o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids. Instead of these acids it is also possible to use their anhydrides, provided they exist. In the formation of polyester polyols small amounts of carboxylic acids having 3 or more carboxyl groups, for example trimellitic anhydride or the adduct of maleic anhydride with unsaturated fatty acids, may also be present.

It is also possible to use polyester diols which are obtained by reacting a lactone with a diol. They are distinguished by the presence of terminal hydroxyl groups and recurring polyester moieties of the formula $(-CO-(CHR^2)_n-CH_2-O)$. In this formula n is preferably 4 to 6 and the substituent $R^2$ is hydrogen or an alkyl, cycloalkyl or alkoxy radical.

No substituent contains more than 12 carbon atoms. The total number of carbon atoms in the substituent does not exceed 12 per lactone ring. Corresponding examples are hydroxycaproic acid, hydroxybutyric acid, hydroxydecanoic acid and/or hydroxystearic acid.

The unsubstituted $\epsilon\Sigma$-caprolactone in which n has the value of 4 and all R substituents are hydrogen, is preferred for the preparation of the polyester diols. The reaction with lactone can be initiated by low-molecular polyols, such as ethylene glycol, 1,3-propanediol, 1,4-butanediol and dimethylolcyclohexane. However, it is also possible to react other reaction components, such as ethylenediamine, alkyldialkanolamines or even urea, with caprolactone.

Aliphatic and/or cycloaliphatic and/or aromatic polyisocyanates may be used as the component (ii). Examples of aromatic polyisocyanates are phenylene diisocyanate, tolylene diisocyanate, xylylene diisocyanate, biphenylene diisocyanate, naphthylene diisocyanate and diphenylmethane diisocyanate.

Because of their good resistance to ultraviolet light, (cyclo)aliphatic polyisocyanates furnish products with a low tendency to yellowing. Examples of these are isophorone diisocyanate, cyclopentylene diisocyanate and hydrogenation products of aromatic diisocyanates such as cyclohexylene diisocyanate, methylcyclohexylene diisocyanate and dicyclohexylmethane diisocyanate. Aliphatic diisocyanates are compounds of the formula $$OCN-(CR^3{}_2)_r-NCO$$

in which r is an integer from 2 to 20, especially 6 to 8, and the substituents $R^3$ which may be identical or different are hydrogen or a lower alkyl radical having 1 to 8 carbon atoms, preferably 1 to 2 carbon atoms. Examples of these are trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate and trimethylhexane diisocyanate. Particularly preferred diisocyanates are isophorone diisocyanate and dicyclohexylmethane diisocyanate.

The composition of the component (ii) in respect of the functionality of the polyisocyanates must be such that no crosslinked polyurethane resin is obtained. In addition to diisocyanates, the component (ii) may also contain a proportion of polyisocyanates having functionalities greater than two, for example triisocyanates.

Products which are formed by trimerization or oligomerization of diisocyanates or by reaction of diisocyanates with polyfunctional compounds containing OH or NH groups have been found to be suitable triisocyanates. This group of compounds includes, for example, the biuret of hexamethylene diisocyanate and water, the isocyanurate of hexamethylene diisocyanate or the adduct of isophorone diisocyanate and trimethylolpropane. The average functionality may be reduced, if appropriate, by the addition of monoisocyanates. Examples of such chain-terminating monoisocyanates are phenyl isocyanate, cyclohexyl isocyanate and stearyl isocyanate.

In order to ensure the water-thinnability of the polyurethane resins used it is necessary to incorporate in the polyurethane molecules groups capable of forming anions. Groups capable of forming anions ensure, after being neutralized, that the polyurethane resin can be dispersed in water to form a stable dispersion. The polyurethane resin should have an acid value of 10 to 60, preferably 20 to 35. The amount of groups capable of forming anions to be introduced in the polyurethane molecules can be calculated from the acid value.

The introduction of groups capable of forming anions in the polyurethane molecule is carried out by incorporating compounds (iii).

Compounds containing in the molecule two groups reactive towards isocyanate groups are preferably used as the component (iii). Suitable groups reactive toward isocyanate groups are in particular hydroxyl groups as well as primary and/or secondary amino groups. Groups suitable for forming anions are carboxyl, sulfonic acid and/or phosphonic acid groups, carboxyl groups being preferred. Alkanoic acids having two substituents on the α carbon atoms may be used, for example, as the component (iii). The substituent may be a hydroxyl group, an alkyl group or, preferably, an alkylol group. These alkanoic acids have at least one, generally 1 to 3, carboxyl groups in the molecule. They have two up to about 25, preferably 3 to 10 carbon atoms. Examples of the component (iii) are dihydroxypropionic acid, dihydroxysuccinic acid and dihydroxybenzoic acid. A group of alkanoic acids which is particularly preferred comprises the α,α-dimethylolalkanoic acids of the general formula $R^4-C(CH_2OH)_2COOH$, in which $R^4$ is a hydrogen atom or an alkyl group having up to about 20 carbon atoms. Examples of such compounds are 2,2-dimethylolacetic acid, 2,2-dimethylolpropionic acid, 2,2-dimethylolbutyric acid and 2,2-dimethylolpentanoic acid. 2,2-Dimethylolpropionic acid is the preferred dihydroxyalkanoic acid. Examples of compounds containing amino groups are α,δ-diaminovaleric acid, 3,4-diaminobenzoic acid, 2,4-diaminotoluenesulfonic acid and 2,4-diaminodiphenyl ether sulfonic acid.

The polyurethane resins used according to the invention may be prepared, if appropriate, by a concomitant use of organic compounds containing hydroxyl and/or amino groups and having a molecular weight of 40 to 600, or a mixture of such compounds (component (iv)). The use of the component (iv) leads to an increase in molecular weight of the polyurethane resins. For example, polyols having up to 20 carbon atoms per molecule, such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, di(trimethylolpropane) ether, pentaerythritol, 1,2-cyclohexanediol, 1,4-cyclohexanedimethanol, bisphenol A, bisphenol F, neopentyl glycol, neopentyl glycol hydroxypivalate, hydroxyethylated or hydroxypropylated bisphenol A, hydrogenated bisphenol A and mixtures thereof may be used as the component (iv).

In general, the polyols are used in amounts of up to 30 percent by weight, preferably 2 to 20 percent by weight, based on the total amount of the components (i) and (iv). Diamines and/or polyamines with primary and/or secondary amino groups may also be used as the component (iv). The polyamines are essentially alkylenepolyamines having 1 to 40 carbon atoms, preferably about 2 to 15 carbon atoms. They may contain substituents which are free from any hydrogen atoms capable of reacting with isocyanate groups. Examples are polyamines with a linear or branched aliphatic, cycloaliphatic or aromatic structure and at least two primary amino groups. Examples of suitable diamines are hydrazine, ethylenediamine, propylenediamine, 1,4-butylenediamine, piperazine, 1,4-cyclohexyldimethylamine, 1,6-hexamethylenediamine, trimethylhexamethylenediamine, menthanediamine, isophoronediamine, 4,4'-diaminodicyclohexylmethane and aminoethylethanolamine. Preferred diamines are hydrazine, alkyl- or cycloalkyldiamines, such as propylenediamine and 1-amino-3-aminomethyl-2,5,5-trimethylcyclohexane. Polyamines containing more than two amino groups in the molecule may be also used as the component (iv). However, in such cases care must be taken, for example by a concomitant use of monoamines, that no crosslinked polyurethane resins are obtained. Polyamines of this type which can be used are diethylenetriamine, triethylenetetramine, dipropylenetriamine and dibutylenetriamine. Ethylhexylamine is an example of a monoamine.

Poly(oxyalkylene) groups may be introduced in the polyurethane molecules as non-ionic stabilizing groups with the aid of the component (v). Alkoxypoly(oxyalkylene) alcohols of the general formula $R'O-(-CH_2-CHR''-O-)_nH$, in which $R'$ is an alkyl radical having 1 to 6 carbon atoms, $R''$ is a hydrogen atom or an alkyl radical having 1 to 6 carbon atoms and n is a number between 20 and 75, may be used, for example, as the component (v).

The preparation of the polyurethane resins which can be used in combination with the polyacrylate resin essential to the invention belongs to the prior art and is described in detail, for example, in U.S. Pat. No. 4,719,132, DE-A-3, 628,124, EP-A-89,497, EP-A-256,450 and WO 87/03829.

The water-thinnable polyester resins to be used in combination with the polyacrylate resins essential to the invention may be prepared from polycarboxylic acids and polyols by generally well known methods. Any of the starting materials listed in the description of the component (i) may be used for the preparation of the polyester resins.

The polyester resins which are preferably used as the water-thinnable polyester resins can be obtained by reacting
(α) polyols or a mixture of polyols and
(β) polycarboxylic acids or polycarboxylic anhydrides, or a mixture of polycarboxylic acids and/or polycarboxylic anhydrides to form a polyester resin having a number average molecular weight of 600 to 5000, preferably 800 to 2500, an acid value of 20 to 70, preferably 25 to 55, and a hydroxyl value of 30 to 200, preferably 45 to 100, in which reaction
the components (α) and (β) are used in a molar ratio of 1.15–2.00:1, preferably 1.2–1.5:1,
the component (α) consists of 30 to 100 mol % of aliphatic diols containing at least one α carbon atom which is secondary, tertiary or a member of a carbon-containing ring system, and
the component (β) consists of 50 to 100 mol % of aromatic and/or cycloaliphatic polycarboxylic acids and of 15 to 40 mol % of tricarboxylic and/or tetracarboxylic acids, the tricarboxylic and/or tetracarboxylic acids being used in such a way that they are incorporated in the polyester resin molecules via at least two carboxyl groups.

The component (α) consists of
(α1) 30 to 100, preferably 50 to 100 mol % of aliphatic diols which contain at least one α carbon atom which is secondary, tertiary or a member of a carbon-containing ring system,
(α2) 0 to 20, preferably 0 to 10 mol % of aliphatic triols and
(α3) 0 to 40, preferably 0 to 20 mol % of diols containing ether groups.

In principle any aliphatic diol having 4 to 40, preferably 5 to 12 carbon atoms in the molecule, in which at least one α carbon atom is a secondary or tertiary carbon atom or a member of a carbon-containing ring system, may be used as the component (α1). Mixtures of such diols may also be used. Compounds which may be used as the component (α1) are, for example, those containing at least one molecular fragment of the general formula —C(R$^1$R$^2$)—CH$_2$OH, R$^1$ and R$^2$ being aliphatic, cycloaliphatic or aromatic hydrocarbon radicals having 1 to 20, preferably 1 to 6, carbon atoms. Examples of such compounds are neopentyl glycol, 2-methyl-2-propyl-1,3-propanediol, 2-ethyl-2-butyl-1,3-propanediol, 2-ethyl-2-phenyl-1,3-propanediol, 2,2,4-trimethyl-1,5-pentanediol, 2,2,5-trimethyl-1,6-hexanediol and neopentyl glycol hydroxypivalate. An example of a compound in which at least one α carbon atom is a member of a carbon-containg ring system, is dimethylolcyclohexane. Neopentyl glycol, neopentyl glycol hydroxypivalate, dimethylolcyclohexane and 2-ethyl-2-butyl-1,3-propanediol are preferably used as the component (α1).

Glycerol, trimethylolpropane and trimethylolethane, for example, may be used as the component (α2).

Diols which are used as the component (α3) in particlular those which contain 1 to 10 ether oxygen atoms in the molecule or mixtures of such compounds. The following are examples of the component (α3): diethylene glycol, dipropylene glycol, triethylene glycol, tripropylene glycol, tetraethylene glycol, tetrapropylene glycol and poly(ethylene oxide), poly(propylene oxide) and poly(ethylene oxide) (propylene oxide) having number average molecular weights of 400 to 600.

The component (β) consists of
(β1) 50 to 100, preferably 50 to 80 mol % of aromatic and/or cycloaliphatic polycarboxylic acids or mixtures of such polycarboxylic acids, and
(β2) 0 to 50, preferably 20 to 50 mol % of aliphatic polycarboxylic acids or mixtures of aliphatic carboxylic acids, the proportion of tricarboxylic or tetracarboxylic acids being 15 to 40 mol %. Reactive carboxylic acid derivatives, such as carboxylic anhydrides, may of course also be used instead of the carboxylic acids.

In principle any cycloaliphatic or aromatic polycarboxylic acid having 5 to 30, preferably 6 to 18 carbon atoms in the molecule or an anhydride of this polycarboxylic acid or a mixture of these polycarboxylic acids or their anhydrides may be used as the component (β1). Examples of polycarboxylic acids which may be used are isophthalic acid, terephthalic acid, orthophthalic acid, tetrahydrophthalic acid, hexahydrophthalic acid, 1,4-cyclohexanedicarboxylic acid, dicyclopentadienedicarboxylic acid, trimesic acid (benzene-1,3,5-tricarboxylic acid), trimellitic acid, pyromellitic acid and endomethylenetetrahydrophthalic acid as well as their anhydrides. Isophthalic acid, terephthalic acid, orthophthalic acid, tetrahydrophthalic acid, hexahydrophthalic acid, trimellitic acid, pyromellitic acid, their anhydrides or mixtures of these polycarboxylic acids or of their anhydrides are preferably used as the component (β1).

In principle any linear or branched aliphatic polycarboxylic acid having 2 to 40 carbon atoms in the molecule or an anhydride of these polycarboxylic acids or a mixture of these polycarboxylic acids or their anhydrides may be used as the component (β2). Examples of aliphatic polycarboxylic acids which may be used are oxalic acid, malonic acid, succinic acid, glutaric acid, adipic acid, pimelic acid, suberic acid, azelaic acid, sebacic acid, maleic acid, fumaric acid, polymerized fatty acids and citric acid as well as their anhydrides. Adipic acid, azelaic acid, sebacic acid, succinic acid, their anhydrides or mixtures of these polycarboxylic acids or their anhydrides are preferably used as the component (β2). Polymerized fatty acids, especially dimerized fatty acids, are quite particularly preferred as the component (β2). When polymerized fatty acids are used as the component (β2), basecoats are obtained having a particularly good shelf life.

Polymeric fatty acids are generally prepared by polymerizing fatty acids, for example linolenic, linoleic or oleic acid individually, in admixture with each other or in admixture with saturated fatty acids. A mixture is obtained which contains mainly dimeric, but also monomeric and trimeric molecules as well as by-products, depending on the conduct of the reaction. The products are normally purified by distillation. Commercial polymeric fatty acids generally contain at least 80% by weight of dimeric fatty acids, up to 20% by weight of trimeric fatty acids and not more than 1% by weight of monomeric fatty acids. It is preferred to use as the component (β2) polymeric fatty acids which consists of at least 98% by weight of dimeric fatty acids and of not more than 2% by weight of trimeric fatty acids and not more than traces of monomeric fatty acids.

Polymeric fatty acids contain both cyclic and linear aliphatic molecular fragments. However, in the context of the present inventions they are considered not as cycloaliphatic but as linear aliphatic polycarboxylic acids and are thus included under component (β2).

Trimellitic acid or pyromellitic acid, mixtures thereof or anhydrides thereof, are preferably used as the tricarboxylic or tetracarboxylic acids.

The preparation of the water-thinnable polyester resins is carried out according to generally well known methods of polyester chemistry by reacting the component (a) with the component (β). The reaction temperature should expediently be about 140 to 240, preferably 180° to 220° C. It may be expedient in some cases to catalyze the esterification reaction. Examples of catalysts which can be used are tetrabutyl titanate, zinc octoate, tin octoate, dibutyltin oxide, organic salts of dibutyltin oxide etc. Care must be taken during the esterification that the tricarboxylic or tetracarboxylic acids are incorporated into the polyester resin molecules in such a way that on statistical average at least two carboxyl groups are esterified.

Ammonia and/or amines (in particular alkylamines), aminoalcohols and cyclic amines, such as diethylamine and triethylamine, dimethylaminoethanolamine, diisopropanolamine, morpholine, N-alkylmorpholine etc. may be used for the neutralization of the polyester resins. Highly volatile amines are preferred for the neutralization.

The amino resins which can be used in combination with the polyacrylate resins essential to the invention are available from many companies as commercial products (for example Cymel® from American Cyanamid Company, Resimene® from Monsanto Company and Luwipal® from BASF AG). Usually they are at least partially etherified condensation products of compounds containing amino groups, in particular melamine or benzoguanamine and aldehydes, in particular formaldehyde. The water-thinnability of the amino resins generally depends on the degree of condensation and on the etherification component. The lower the degree of condensation and the shorter the chains of the alkyl groups in the etherification component, the better is the water-thinnability of the amino resins. The water-thinnability of amino resins may also be enhanced by the introduction of carboxyl groups (for example etherification using hydroxycarboxylic acids). Furthermore, water-thinnability of amino resins may be enhanced by the addition of water-thinnable solvents, for example glycol ethers.

In addition to the binders described above, the basecoats according to the invention may contain other water-thinnable synthetic resins which are used for grinding of the pigments and/or as rheology-controlling additives. Examples of such synthetic resins are polyethers, for example polypropylene glycol having a number average molecular weight of 400 to 900, water-soluble cellulose ethers such as hydroxyethyl cellulose, methyl cellulose or carboxymethyl cellulose as well as synthetic polymers containing ionic and/or associatively acting groups, such as polyvinyl alcohol, poly(meth)acrylamide, poly(meth)acrylic acid, polyvinylpyrrolidone, styrene-maleic anhydride or ethylene-maleic anhydride copolymers and their derivatives or hydrophobicity modified ethoxylated urethanes, or polyacrylates containing carboxyl groups.

The basecoats according to the invention may also contain crosslinked polymicroparticles, such as those disclosed, for example, in EP-A-38,127.

The basecoats according to the invention may also contain inorganic rheology-controlling agents, for example phyllosilicates.

The basecoats according to the invention may contain as pigments chromophoric inorganic pigments, for example titanium dioxide, iron oxide, carbon black etc. and/or chromophoric organic pigments and/or conventional metallic pigments (for example commercial aluminum bronzes, stainless steel bronzes . . . ) and/or non-metallic special-effect pigments (for example pearlescent pigments or interference pigments). The basecoats according to the invention preferably contain metallic pigments and/or special-effect pigments. The degree of pigmentation is within customary levels.

At spraying viscosity, the basecoats according to the invention generally have a solids content of about 15 to 50% by weight. The solids content varies according to the intended application of the basecoats. That of metallic paints is preferably, for example, 17 to 25% by weight. For solid-color paints it is higher, for example about 30 to 45% by weight.

The basecoats according to the invention may additionally contain conventional organic solvents. Their proportion is kept as low as possible. It is, for example, below 15% by weight.

The pH of the basecoats according to the invention is generally adjusted to between 6.5 and 9.0. The pH can be adjusted with conventional amines, for example triethylamine, dimethylaminoethanol and N-methylmorpholine.

The basecoats according to the invention may be used both in production line finishing and in refinishing. They are preferably used in production line finishing.

Organic solvent-borne paints, water-thinnable paints and powder paints may be used as the transparent topcoats. The paints may be used as unpigmented clearcoats or as transparently pigmented paints.

Using the basecoats according to the invention, it is possible to produce a high-quality finish even without recoating with a transparent topcoat. One-coat finishes are obtained in this manner which are distinguished by a particularly high gloss.

The paints according to the invention may be applied to any substrate, for example metal, wood, plastic or paper.

In the examples below the invention is elucidated in greater detail.

All parts and percentages are by weight, unless expressly stated otherwise.

A. Preparation of polyacrylate resins to be used according to the invention

A 1

32 parts by weight of butyl glycol are introduced into a steel reaction vessel fitted with monomer feed, initiator feed, thermometer, oil heating and reflux condenser, and the charge is heated to 110° C. A solution of 6.0 parts by weight of t-butyl perethylhexanoate in 6.0 parts by weight of butyl glycol is then added at such a rate that the addition is concluded after 5 h 30 min.

At the same time as the addition of the t-butyl perethylhexanoate solution commences, the addition commences of a mixture consisting of (a1): 21.6 parts by weight of n-butyl methacrylate, 20.0 parts by weight of methyl methacrylate and 20.0 parts by weight of lauryl methacrylate; (a2): 20.4 parts by weight of hydroxypropyl acrylate and (a3): 15.0 parts by weight of styrene. The mixture of (a1), (a2) and (a3) is added at such a rate that the addition is concluded in 5 h.

When the t-butyl perethylhexanoate solution has been completely added, the polymerization temperature is kept at 110° C. for a further 1 h.

Subsequently a solution of 1.56 parts by weight of t-butyl perethylhexanoate in 3.5 parts by weight of butyl glycol is added at such a rate that the addition is concluded after 1 h 30 min. At the same time as the addition of the t-butyl perethylhexanoate solution commences, the addition commences of a mixture consisting of (b1): 5.6 parts by weight of acrylic acid and (b2): 3.1 parts by weight of butyl methacrylate, 1.96 parts by weight of methyl methacrylate and 3.93 parts by weight of lauryl methacrylate and 1.96 parts by weight of styrene.

The mixture of (b1) and (b2) is added at such a rate that the addition is concluded after 1 h.

The temperature is kept at 110° C. for a further 1 h 30 min. The resin solution obtained in this way is concentrated by vacuum distillation to 80% by weight (solids content) and neutralized with dimethylethanolamine at about 80° C. to an 80% degree of neutralization over about 30 min. The resin solution is cooled to 60° C. and the heating is arrested.

Water is then slowly added until the solids content of the dispersion is about 40% by weight.

The resultant dispersion has the following characteristics: acid value 35.8 mg of KOH/g, hydroxyl value: 80, number average molecular weight: 4990, particle size 221 nm[1]

[1] measured using laser light scatter, measuring instrument: Malvern Autosizer 2C.

A2

35.8 parts by weight of butyl glycol are introduced into a steel reaction vessel fitted with monomer feed, initiator feed, thermometer, oil heating and reflux condenser and the charge is heated to 110° C. A solution of 3.5 parts by weight of t-butyl perethyl-hexanoate in 7.0 parts by weight of butyl glycol is then added at such a rate that the addition is concluded after 5 h 30 min.

At the same time as the addition of the t-butyl perethylhexanoate solution commences, the addition commences of a mixture consisting of (a1): 22.0 parts by weight of n-butyl acrylate, 20.0 parts by weight of t-butyl acrylate and 15.0 parts by weight of methyl methacrylate; (a2): 23.0 parts by weight of hydroxypropyl acrylate and (a3): 15.0 parts by weight of styrene. The mixture of (a1), (a2) and (a3) is added at such a rate that the addition is concluded after 4 h 50 min.

When the mixture of (a1), (a2) and (a3) has been completely added, (b1): 5.0 parts by weight of acrylic acid are added at such a rate that the addition is concluded after 20 min.

The temperature is kept at 110° C. for a further 1 h 50 min. The resin solution obtained in this way is cooled to 80° C. and neutralized with dimethylethanolamine at about 80° C. to an 82.5% degree of neutralization over about 30 min. The resin solution is cooled to 60° C. and the heating is arrested.

Water is then slowly added until the solids content of the dispersion is about 40% by weight.

The resultant dispersion has the following characteristics: acid value 36.5 mg of KOH/g, hydroxyl value: 100, particle size: 267, solids content (in % by weight, 1 h, 130° C.): 40.0.

B. Preparation of a polyacrylate resin which is not according to the invention 35.8 parts by weight of butyl glycol are introduced into a steel reaction vessel fitted with monomer feed, initiator feed, thermometer, oil heating and reflux condenser and the charge is heated to 110° C. A solution of 3.5 parts by weight of t-butyl perethylhexanoate in 7.0 parts by weight of butyl glycol is added at such a rate that the addition is concluded after 5 h 30 min. At the same time as the addition of the t-butyl perethylhexanoate solution commences, the addition commences of a mixture of 22.0 parts by weight of n-butyl acrylate, 20.0 parts by weight of t-butyl acrylate, 15.0 parts by weight of methyl methacrylate, 15.0 parts by weight of styrene, 23.0 parts by weight of hydroxypropyl acrylate and 5.0 parts by weight of acrylic acid. The monomer mixture is added at such a rate that the addition is concluded after 5 h 10 min. The further procedure follows that of A 2.

The resultant dispersion has the following characteristics: acid value: 39.0 mg of KOH/g, hydroxyl value: 100, solids content (in % by weight, 1 h, 130° C.): 40.0.

C. Preparation of an aqueous polyurethane resin dispersion 569 parts by weight of a condensation product (number average molecular weight 1460) obtained from 1 mol of a polymeric fatty acid (dimer content at least 98% by weight, trimer content not more than 2% by weight, monomer content not more than traces), 1 mol of isophthalic acid and 2.626 mol of hexanediol, 46 parts by weight of dimethylolpropionic acid, 7 parts by weight of neopentyl glycol, 420 parts by weight of methyl ethyl ketone and 213 parts by weight of isophorone diisocyanate are heated to 80° C. in an atmosphere of nitrogen in a temperature-controllable reaction vessel fitted with a stirrer and water separator. The reaction is allowed to proceed to an NCO content of 1.0% by weight, based on the total composition. 24 parts by weight of trimethylolpropane are added and the reaction mixture is stirred at 80° C. until no isocyanate groups are detectable.

25.8 parts by weight of dimethylethanolamine and subsequently 2552 parts by weight of deionized water are slowly added with stirring. The methyl ethyl ketone is removed by vacuum distillation.

A finely divided dispersion is obtained having a pH of 7.8, a non-volatile content of 27% by weight and an acid value of 25 mg of KOH/g.

D. Preparation of an aqueous polyester resin dispersion 729 parts by weight of neopentyl glycol, 827 parts by weight of hexanediol, 462 parts by weight of hexahydrophthalic anhydride and 1710 parts by weight of a polymeric fatty acid (dimer content at least 98% by weight, trimer content not more than 2% by weight, monomer content not more than traces) are weighed into a reaction vessel fitted with a stirrer, a thermometer and a packed column, and the mixture is melted. The rate of heating, with stirring, is such that the temperature at the head of the column does not exceed 100° C. Esterification is allowed to proceed at 220° C. max. until an acid value of 8.5 is reached. The reaction mixture is allowed to cool to 180° C., 768 parts by weight of trimellitic anhydride are added and esterification is allowed to proceed further until an acid value of 30 is reached. The mixture is then cooled to 120° C. and brought into solution with 1410 parts by weight of butanol. The mixture is allowed to cool to 90° C. and 16.2 parts by weight of dimethylethanolamine and subsequently 1248 parts by weight of deionized water are slowly added with stirring. A finely divided dispersion is obtained having a pH of 7.8, a non-volatile content of 60% by weight and an acid value of 30 mg of KOH/g.

E. Production of an aqueous metallic basecoat (Comparison Example)

33.5 parts by weight of a thickener (3% paste of a sodium-magnesium phyllosilicate* in water) are treated with a solution consisting of 4.3 parts by weight of

*Laponite RD butyl glycol and 6.0 parts by weight of a 90% solution of a commercial water-thinnable melamine-formaldehyde resin in isobutanol (Cymel 327®[1]) with stirring. 33.3 parts by weight of the polyurethane resin dispersion from C and 0.4 part by weight of a dimethylethanolamine solution (10% in H$_2$O) are subsequently added to this mixture with stirring. An aluminum pigment suspension is prepared separately as follows: 4.4 parts by weight of a commercial chromatized aluminum paste (65% in petroleum spirit/solvent naphtha/butyl glycol, average particle diameter: 15 μm) are homogenized by the addition of 4 parts by weight of butyl glycol. 6.4 part by weight of the water-soluble polyester resin from D and 1.0 part by weight of polypropylene glycol (number average molecular weight: 900) are then added to this suspension. This aluminum pigment suspension is added with stirring to the mixture described above. 6.7 parts by weight of deionized water are added subsequently and the pH of the mixture is adjusted to 7.65–7.85 with dimethylethanolamine solution (10% in water).

®[1] Commercial product from American Cyanamid Company

F. Production of an aqueous metallic basecoat according to the invention 33.5 parts by weight of a thickener (3% paste of a sodium-magnesium phyllosilicate* in water) are treated with a solution of 4.3 parts by weight of butyl glycol and 6.0 parts by weight of a 90% solution of a commercial water-thinnable melamine-formaldehyde resin in isobutanol (Cymel 327®) with stirring. 33.3 parts by weight of the polyurethane resin dispersion from C, 0.4 part by weight of dimethylethanolamine solution (10% in water) and 4.8 parts by weight of the polyacrylate resin dispersion from A 1 are added successively to this mixture with stirring. An aluminum pigment suspension is prepared separately as follows: 4.4 parts by weight of a commercial chromatized aluminum paste (65% in petroleum spirit/solvent naphtha/butyl glycol, average particle diameter: 15 μm) are homogenized by the addition of 4 parts by weight of butyl glycol. 3.2 part by weight of the water-soluble polyester resin from D and 1.0 part by weight of polypropylene glycol (number average molecular weight: 900) are then added to this suspension. This aluminum pigment suspension is added to the mixture described above with stirring. 3.8 parts by weight of deionized water are added subsequently and the pH of the mixture is adjusted to 7.65–7.85 with dimethylethanolamine solution (10% in water).

Laponite RD

G. Application and testing of the aqueous metallic basecoats

The aqueous metallic basecoats produced in E and F are adjusted to an application solids content of 24.2% by weight with distilled water and are applied to a phosphated steel panel coated with a commercial electrodeposition primer [l+f glossay] and a commercial body filler in such a way that a dry film thickness of 12–15 μm is obtained. The applied basecoats are dried for 10 minutes at room temperature and for 10 minutes at 80° C. in a circulating air oven. A commercial two-component clearcoat based on polyacrylate/polyisocyanate is then applied, the panel is then flashed off for a brief period and baked at 140° C. in a circulating air oven for 20 min.

| Test results: | Basecoat from E | Basecoat from F |
|---|---|---|
| L 25° (1) | 102.7 | 103.2 |
| L 70° (1) | 40.4 | 40.9 |
| Gloss (2) | 83 | 84 |
| DOI (3) | 92 | 92 |
| Crosshatch (4) | 0 | 0 |
| Gloss after humidity test (5) | 81 | 81 |
| Crosshatch after humidity test | 1 | 1 |
| DOI after humidity test | 91 | 91 |

(1) Color content L* according to DIN 6174, determined using the Zeiss goniospectrophotometer.
(2) Degree of gloss according to DIN 67530, angle of 20°
(3) Distinctness of reflected image: with the surface to be assessed illuminated at an angle of 30°, the direct reflection is measured at an angle of incidence of −30 ° and in the immediate proximity of the angle of incidence at −30° C. ± 0.3°. The DOI value thus determined corresponds with the visually perceived sharpness of the reflected image of an object on this surface. The DOI value is also referred to as image sharpness value. Rating: 100 best value: 0 worst value.
(4) Test according to DIN 53151 including the Tesa peel-off test.
(5) Humidity test at 40° C. for 240 h (according to DIN 50017)

Test of viscosity stability under shearing stress

To test viscosity stability under shearing stress, clearcoat media (clearcoat medium=basecoat without pigments) of the basecoats from E and F are vigorously stirred for 1 h using a paddle stirrer, are then sheared in a viscometer at a shear rate of 0 to 50 s$^{-1}$ and the viscosities are measured. The clearcoat medium from the basecoat from E exhibited a viscosity drop of about 40%. On the other hand, the clearcoat medium from the basecoat from F exhibited a viscosity drop of less than 10%. This low viscosity drop has no negative effects on application characteristics and sedimentation behaviour.

H. Production of a pigment paste for aqueous solid basecoats 10 parts by weight of a thickener (3% paste of a sodium-magnesium phyllosilicate in water) is treated with 4.5 parts by weight of dimethylethanolamine solution (10% in water), 2 parts by weight of polypropylene glycol (molecular weight 900), 46.70 parts by weight of the polyester resin from D and 23.35 parts by weight of deionized water with stirring. The following pigments are then added individually with stirring: 2.65 parts by weight of Irgazin Red DPP BO®[1], 4.38 parts by weight of Cromophthal Red A2B®[1], 5.29 parts by weight of Novoperm Orange H2 70®[2] and 1.13 parts by weight of Sicotan Yellow 2 1912®[3]. The mixture is finally homogenized for 20 minutes using a conventional laboratory dissolver. The mixture is then ground in a conventional laboratory bead mill to a Hegmann (ISO 152) particle fineness of ≦5 μm.

®[1] Commercial product from Ciba Geigy
®[2] Commercial product from Hoechst AG
®[3] Commercial product from BASF AG The pH of the pigment paste should be between 8 and 8.5, failing which the pH is adjusted to this value using a dimethylethanolamine solution (10% in water).

I. Production of aqueous solid basecoats

Two solid basecoats are produced using the pigment paste and the components listed below, the solid basecoat 2 being used as a comparison example. The weight ratio of pigment to solid resin and the weight ratio of OH-containing solid resin to melamine-formaldehyde resin are the same in both basecoats.

|  | Solid basecoat 1 | Solid basecoat 2 |
|---|---|---|
| Pigment paste | 41.33 | 33.57 |
| Polyacrylate resin from A 2 | 25.77 | — |
| Polyacrylate resin from B | — | 20.90 |
| Luwipal LR 8789 | 5.88 | 4.77 |
| Resimene 4518 | 0.92 | 0.75 |
| Deionized water | 26.10 | 40.01 |

The above constituents are mixed successively with stirring. The figures quoted are parts by weight. The viscosities of the basecoats obtained in this way are adjusted to 28 s (DIN 4). The solid basecoat 1 has at this viscosity a solids content of 34% by weight (1 h, 130° C.) and the solid basecoat 2 a solids content of 28.3% by weight (1 h, 130° C.).

J. Application and testing of the solid basecoats

The aqueous solid basecoats produced in I. are stored for 48 hours and then applied to phosphated steel panels coated with a commercial electrodeposition primer [L+F glossary] and a commercial body filler by the following procedure: compressed air jet spray application at a relative atmospheric humidity of 60% and a temperature of 23° C., two-coat application with a flash-off time of 2 minutes after the first application, a flash-off time of 1 minute after the second application and 10 minutes' drying in a circulating air oven at 80° C. The commercial clearcoat based on polyacrylate/melamineformaldehyde resin is then applied, followed by a brief flash-off period and baking for 30 minutes at 130° C.

A test of the resultant two-coat finish obtained in this way gave the following results:

|  | Two-coat finish using solid basecoat 1 | Two-coat finish using solid basecoat 2 |
| --- | --- | --- |
| Stone-chip resistance test according to VDA[1] | 2 | 2–3 |
| Crosshatch test | 0 | 0 |
| Gloss at 20° | 87 | 87 |
| Blister limit[2] | 48 μm | 28 μm |
| Run limit[3] | 48 μm | 24 μm |

[1]VDA: Verband der deutschen Automobilindustrie; blasting medium: 1000 g of bevelled shot; particle size: 4–5 mm; pressure: 1.5 bar; VDA stone-chip resistance tester 508
[2]Application by the described method; basecoat film thicknesses at which blistering occurs
[3]Application by the described method; basecoat film thicknesses at which runs appear in the basecoat film when applied to vertical perforated panels and subsequently predried in a vertical position.

We claim:

1. A process for the production of a multicoat finish, including the steps of:
   (1) applying an aqueous, pigmented basecoat to a substrate surface as basecoat,
   (2) forming a polymer film from the coating applied in stage (1),
   (3) applying a transparent topcoat to the basecoat, and subsequently
   (4) baking the basecoat together with the topcoat; wherein the basecoat contains a water-thinnable, uncrosslinked polyacrylate resin prepared by a solution polymerization process consisting essentially of the steps of:
   (I) polymerizing
      (a1) 40 to 90% by weight of a (meth)acrylic acid ester essentially free from carboxyl groups selected from the group consisting of alkyl acrylates, alkyl methacrylates, cycloaliphatic acrylic acid esters, cycloaliphatic methacrylic acid esters, and mixtures thereof,
      (a2) 0 to 45% by weight of an ethylenically unsaturated monomer which contains at least one hydroxyl group per molecule and is essentially free from carboxyl groups, or a mixture of such monomers, and
      (a3) 0 to 40% by weight of an ethylenically unsaturated monomer essentially free from carboxyl groups, which is different from (a 1) and (a2),
   in an organic solvent or mixture of solvents in the presence of at least one polymerization initiator, and
   (II) adding, after at least 80% by weight of the monomers in stage (I) have reacted,
      (b1) 2.5 to 15% by weight of an ethylenically unsaturated monomer containing at least one carboxyl group per molecule, or a mixture of such monomers, and
      (b2) 0 to 60% by weight of an ethylenically unsaturated monomer essentially free from carboxyl groups, or a mixture of such monomers, and continuing the polymerization to obtain the polyacrylate resin, and
   (III) neutralizing, at least partially, the polyacrylate resin and dispersing it in water;
   wherein the sum of (a1), (a2), (a3), (b1), and (b2) is 100% and further wherein the uncrosslinked polyacrylate resin has a hydroxyl value of 0 to 200, an acid value of 20 to 100, a glass transition temperature ($T_G$) of −40° to +60° C., and a molecular weight of between 2,500 and 20,000.

2. The process as claimed in claim 1 wherein the basecoat further contains a metallic pigment or a mixture of metallic pigments.

3. The process as claimed in claim 1, wherein polymerization is carried out in stages (I) and (II) at a temperature of 80° to 160° C. in the presence of at least one free radical-forming initiator, the duration of stage (I) is 2 to 8 hours, and the stage (II) addition is carried out over a period of 10 to 90 minutes.

4. The process as claimed in claim 1, wherein the stage (II) addition is begun after at least 90% by weight of the monomers added in stage (I) have reacted.

5. The process as claimed in claim 1, wherein the basecoat further comprises a resin selected from the group consisting of a water-thinnable polyurethane resin, a water-thinnable polyester resin, a water-thinnable amino resin, and mixtures thereof.

6. The process as claimed in claim 1, wherein the basecoat comprises at least one non-metallic pigment and a mixture consisting of
   (A) 10 to 95% by weight of the water-thinnable polyacrylate resin,
   (B) 5 to 50% by weight of an amino resin,
   (C) 0 to 85% by weight of a water-thinnable polyester resin, and
   (D) 0 to 85% by weight of a water-thinnable polyurethane resin,
the sum of components (A) to (D) being 100%.

7. The process as claimed in claim 1, wherein the basecoat comprises a metallic pigment and a mixture consisting of
   (A) 0.1 to 60% by weight of the water-thinnable polyacrylate resin,
   (B) 0 to 50% by weight of an amino resin,
   (C) 0 to 50% by weight of a water-thinnable polyester resin, and
   (D) 10 to 99.9% by weight of a water-thinnable polyurethane resin,
the sum of components (A) to (D) being 100%.

8. The process as claimed in claim 5, wherein the basecoat comprises a water-thinnable polyester resin obtained by reacting
   (α) a polyol or a mixture of polyols, consisting of 30 to 100 mol % of aliphatic diols containing at least one α carbon that is secondary, tertiary, or in a ring system, and
   (β) a member selected from the group consisting of polycarboxylic acids, polycarboxylic anhydrides, and mixtures thereof, wherein component (β) consists of 50 to 100 mol % of aromatic or cycloaliphatic polycarboxylic acids or mixtures thereof, and 15 to 40 mol % of tricarboxylic or tetracarboxylic acids or mixtures thereof, with the caveat that at least two carboxyl groups of the tricarboxylic and tetracarboxylic acids react on statistical average,
in a molar ratio of components (α) and (β) of 1.15–2.00:1;
and further wherein the polyester resin is at least partially neutralized and has a number average molecular weight of 600 to 5000, an acid value of 20 to 70, and a hydroxyl value of 30 to 200.

9. The process as claimed in claim 8, wherein the component (β) consists of 50 to 80 mol % of aromatic or cycloaliphatic polycarboxylic acids or mixtures thereof, and 20 to 50 mol % of one or more polymeric fatty acids, wherein the polymeric fatty acids are not cycloaliphatic polycarboxylic acids.

10. An aqueous, pigmented paint containing a water-thinnable, uncrosslinked polyacrylate resin prepared by a solution polymerization process consisting essentially of (I) polymerizing
(a1) 40 to 90% by weight of a (meth)acrylic acid ester essentially free from carboxyl groups selected from the group consisting of alkyl acrylates, alkyl methacrylates, cycloaliphatic acrylic acid esters, cycloaliphatic methacrylic acid esters, and mixtures thereof,
(a2) 0 to 45% by weight of an ethylenically unsaturated monomer which contains at least one hydroxyl group per molecule and is essentially free from carboxyl groups, or a mixture of such monomers, and
(a3) 0 to 40% by weight of an ethylenically unsaturated monomer essentially free from carboxyl groups, which is different from (a1) and (a2), or a mixture of such monomers,
in an organic solvent or mixture of solvents in the presence of at least one polymerization initiator, and
(II) adding, after at least 80% by weight of the monomers in stage (I) have reacted,
(b1) 2.5 to 15% by weight of an ethylenically unsaturated monomer containing at least one carboxyl group per molecule, or a mixture of such monomers, and
(b2) 0 to 60% by weight of an ethylenically unsaturated monomer essentially free from carboxyl groups, or a mixture of such monomers, and continuing the polymerization to obtain the polyacrylate resin, and
(III) neutralizing, at least partially, the polyacrylate resin and dispersing it in water;
wherein the sum of (a1), (a2), (a3), (b1) and (b2) is 100% and further wherein the polyacrylate resin has a hydroxyl value of 0 to 200, an acid value of 20 to 100, a glass transition temperature ($T_G$) of −40° to +60° C., and a molecular weight of between 2,500 and 20,000.

11. The paint as claimed in claim 10 wherein the paint further contains a metallic pigment or a mixture of metallic pigments.

12. The paint as claimed in claim 10, wherein polymerization is carried out in stages (I) and (II) at a temperature of 80° to 160° C. in the presence of at least one free radical-forming initiator, the duration of stage (I) is 2 to 8 hours, and the stage (II) addition is carried out over a period of 10 to 90 minutes.

13. The paint as claimed in claim 10, wherein the stage (II) addition is begun after at least 90% by weight of the monomers added in stage (I) have reacted.

14. The paint as claimed in claim 10, wherein the paint further comprises a resin selected from the group consisting of a water-thinnable polyurethane resin, a water-thinnable polyester resin, a water-thinnable amino resin, and mixtures thereof.

15. The paint as claimed in claim 10, wherein the paint comprises at least one non-metallic pigment and a mixture consisting of (A) 10 to 95% by weight of the water-thinnable polyacrylate resin,
(B) 5 to 50% by weight of an amino resin,
(C) 0 to 85% by weight of a water-thinnable polyester resin, and
(D) 0 to 85% by weight of a water-thinnable polyurethane resin,
the sum of components (A) to (D) being 100%.

16. The paint as claimed in claim 10, wherein the paint comprises a metallic pigment and a mixture consisting of (A) 0.1 to 60% by weight of the water-thinnable polyacrylate resin,
(B) 0 to 50% by weight of an amino resin,
(C) 0 to 50% by weight of a water-thinnable polyester resin, and
(D) 10 to 99.9% by weight of a water-thinnable polyurethane resin,
the sum of components (A) to (D) being 100%.

17. The paint as claimed in claim 14, wherein the paint comprises a water-thinnable polyester resin obtained by reacting (α) a polyol or a mixture of polyols, consisting of 30 to 100 mol % of aliphatic diols containing at least one α carbon that is secondary, tertiary, or in a ring system, and
(β) a member selected from the group consisting of polycarboxylic acids, polycarboxylic anhydrides, and mixtures thereof, wherein component (β) consists of 50 to 100 mol % of aromatic or cycloaliphatic polycarboxylic acids or mixtures thereof, and 15 to 40 mol % of tricarboxylic or tetracarboxylic acids or mixtures thereof, with the caveat that at least two carboxyl groups of the tricarboxylic and tetracarboxylic acids react on statistical average, in a molar ratio of components (α) and (β) of 1.15–2.00:1; and further wherein the polyester resin is at least partially neutralized and has a number average molecular weight of 600 to 5000, an acid value of 20 to 70, and a hydroxyl value of 30 to 200.

18. The paint as claimed in claim 12, wherein the component (β) consists of 50 to 80 mol % of aromatic or cycloaliphatic polycarboxylic acids or mixtures thereof, and 20 to 50 mol % of one or more polymeric fatty acids, where the polymeric fatty acids are not cycloaliphatic polycarboxylic acids.

19. The process as claimed in claim 1, wherein the stage (II) addition is carried out over a period of 10 to 90 minutes.

20. The paint as claimed in claim 10, wherein the stage (II) addition is carried out over a period of 10 to 90 minutes.

21. A process for the production of a multicoat finish, including the steps of (1) applying an aqueous, pigmented basecoat to a substrate surface as basecoat,
(2) forming a polymer film from the coating applied in stage (1),
(3) applying a transparent topcoat to the basecoat, and subsequently
(4) baking the basecoat together with the topcoat;
wherein the basecoat contains a water-thinnable, uncrosslinked polyacrylate resin prepared by a solution polymerization process consisting essentially of the steps of:
(I) polymerizing
(a1) 40 to 80% by weight of a (meth)acrylic acid ester essentially free from carboxyl groups selected from the group consisting of alkyl acrylates, alkyl methacrylates, cycloaliphatic acrylic acid esters, cycloaliphatic methacrylic acid esters, and mixtures thereof,
(a2) 4 to 34% by weight of an ethylenically unsaturated monomer which contains at least one hydroxyl group per molecule and is essentially free from carboxyl groups, or a mixture of such monomers, and (a3) 10 to 30% by weight of an ethylenically unsaturated monomer essentially free from carboxyl groups, which is different from (a1) and (a2), in an organic solvent or mixture of solvents in the presence of at least one polymerization initiator, and (II) adding, after at least 80% by weight of the monomers in stage (I) have reacted, (b1) 2.5 to 15% by weight of an ethylenically unsaturated monomer containing at least one carboxyl group per molecule, or a mixture of such monomers, and (b2) 0 to 60% by weight of an ethylenically unsaturated monomer essentially free from carboxyl groups, or a mixture of such monomers, and continuing the polymerization to obtain the polyacrylate resin, and (III) neutralizing, at least partially, the polyacrylate resin and dispersing it in water;

wherein the sum of (a1), (a2), (a3), (b1) and (b2) is 100% and further wherein the uncrosslinked polyacrylate resin has a hydroxyl value of 0 to 200, an acid value of 20 to 100, a glass transition temperature ($T_G$) of −40° to +60° C., and a molecular weight of between 2,500 and 20,000.

22. An aqueous, pigmented paint containing a water-thinnable polyacrylate resin prepared by a solution polymerization process consisting essentially of the steps of:

(I) polymerizing (a1) 40 to 80% by weight of a (meth)acrylic acid ester essentially free from carboxyl groups selected from the group consisting of alkyl acrylates, alkyl methacrylates, cycloaliphatic acrylic acid esters, cycloaliphatic methacrylic acid esters, and mixtures thereof, (a2) 4 to 34% by weight of an ethylenically unsaturated monomer which contains at least one hydroxyl group per molecule and is essentially free from carboxyl groups, or a mixture of such monomers, and (a3) 10 to 30% by weight of an ethylenically unsaturated monomer essentially free from carboxyl groups, which is different from (a1) and (a2), or a mixture of such monomers, in an organic solvent or mixture of solvents in the presence of at least one polymerization initiator, and (II) adding, after at least 80% by weight of the monomers in stage (I) have reacted, (b1) 2.5 to 15% by weight of an ethylenically unsaturated monomer containing at least one carboxyl group per molecule, or a mixture of such monomers, and (b2) 0 to 60% by weight of an ethylenically unsaturated monomer essentially free from carboxyl groups, or a mixture of such monomers, and continuing the polymerization to obtain the polyacrylate resin, and (III) neutralizing, at least partially, the polyacrylate resin and dispersing it in water;

wherein the sum of (a1), (a2), (a3), (b1), and (b2) is 100% and further wherein the uncrosslinked polyacrylate resin has a hydroxyl value of 0 to 200, an acid value of 20 to 100, a glass transition temperature ($T_G$) of −40° to +60° C., and a molecular weight of between 2,500 and 20,000.

23. A process for the production of a multicoat finish according to claim 1, wherein the uncrosslinked polyacrylate resin has a hydroxyl value of 20 to 120, an acid value of 25 to 50, and a glass transition temperature ($T_G$) of −20° to +40° C.

24. The process according to claim 16, wherein the mixture consists of:

(A) 25 to 70% by weight of the water-thinnable polyacrylate resin, (B) 10 to 40% by weight of the amino resin, (C) 20 to 60% by weight of the water-thinnable polyester resin, and (D) 0 to 40% by weight of the water-thinnable polyurethane resin.

25. The process according to claim 7, wherein the mixture consists of:

(A) 1 to 30% by weight of the water-thinnable polyacrylate resin, (B) 5 to 30% by weight of the amino resin, (C) 15 to 40% by weight of the water-thinnable polyester resin, and (D) 20 to 60% by weight of the water-thinnable polyurethane resin.

26. The process as claimed in claim 8, wherein the molar ratio of components ($\alpha$) and ($\beta$) is 1.2–1.5:1, and further wherein the polyester resin has a number average molecular weight of 800 to 2500, an acid value of 25 to 55, and a hydroxyl value of 45 to 100.

27. The paint according to claim 15, wherein the mixture consists of:

(A) 25 to 70% by weight of the water-thinnable polyacrylate resin, (B) 10 to 40% by weight of the amino resin, (C) 20 to 60% by weight of the water-thinnable polyester resin, and (D) 0 to 40% by weight of the water-thinnable polyurethane resin.

28. The paint according to claim 16, wherein the mixture consists of:

(A) 1 to 30% by weight of the water-thinnable polyacrylate resin, (B) 5 to 30% by weight of the amino resin, (C) 15 to 40% by weight of the water-thinnable polyester resin, and (D) 20 to 60% by weight of the water-thinnable polyurethane resin.

29. The paint as claimed in claim 16, wherein the molar ratio of components ($\alpha$) and ($\beta$) is 1.2–1.5:1, and further wherein the polyester resin has a number average molecular weight of 800 to 2500, an acid value of 25 to 55, and a hydroxyl value of 45 to 100.

* * * * *